Feb. 23, 1932.  S. SETH  1,846,694
ANTISHIMMYING DEVICE FOR STEERING MECHANISM
Filed Jan. 12, 1932  2 Sheets-Sheet 1
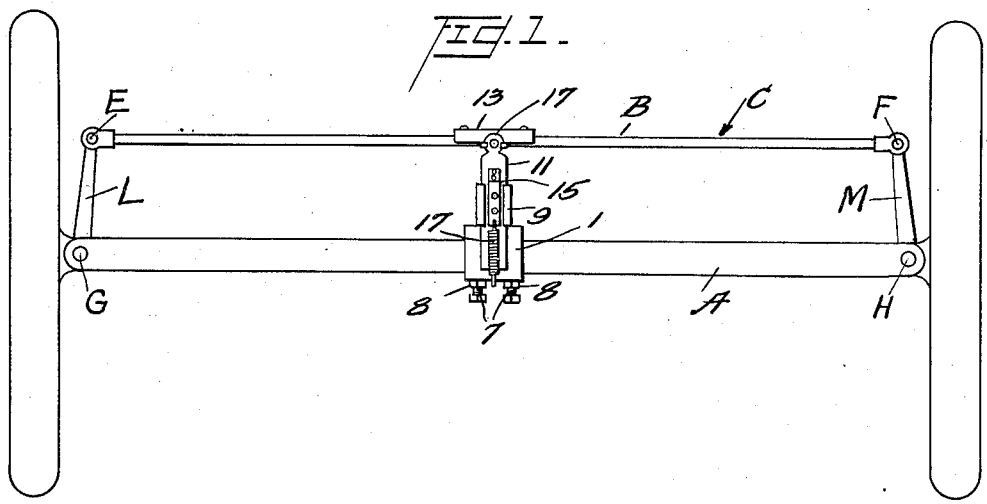
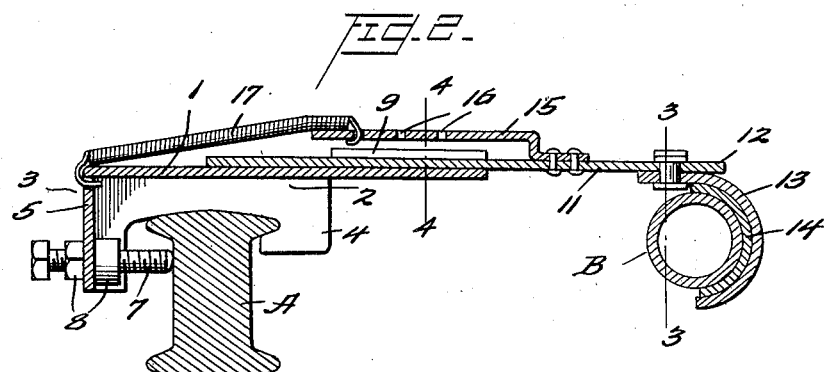
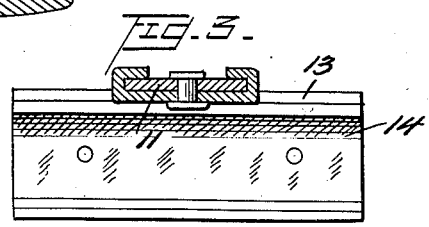
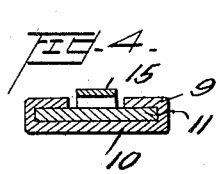
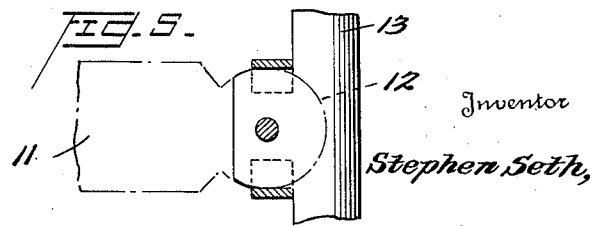
Inventor
Stephen Seth,
By Chas. Silver
Attorney Feb. 23, 1932.  S. SETH  1,846,694
ANTISHIMMYING DEVICE FOR STEERING MECHANISM
Filed Jan. 12, 1932  2 Sheets-Sheet 2
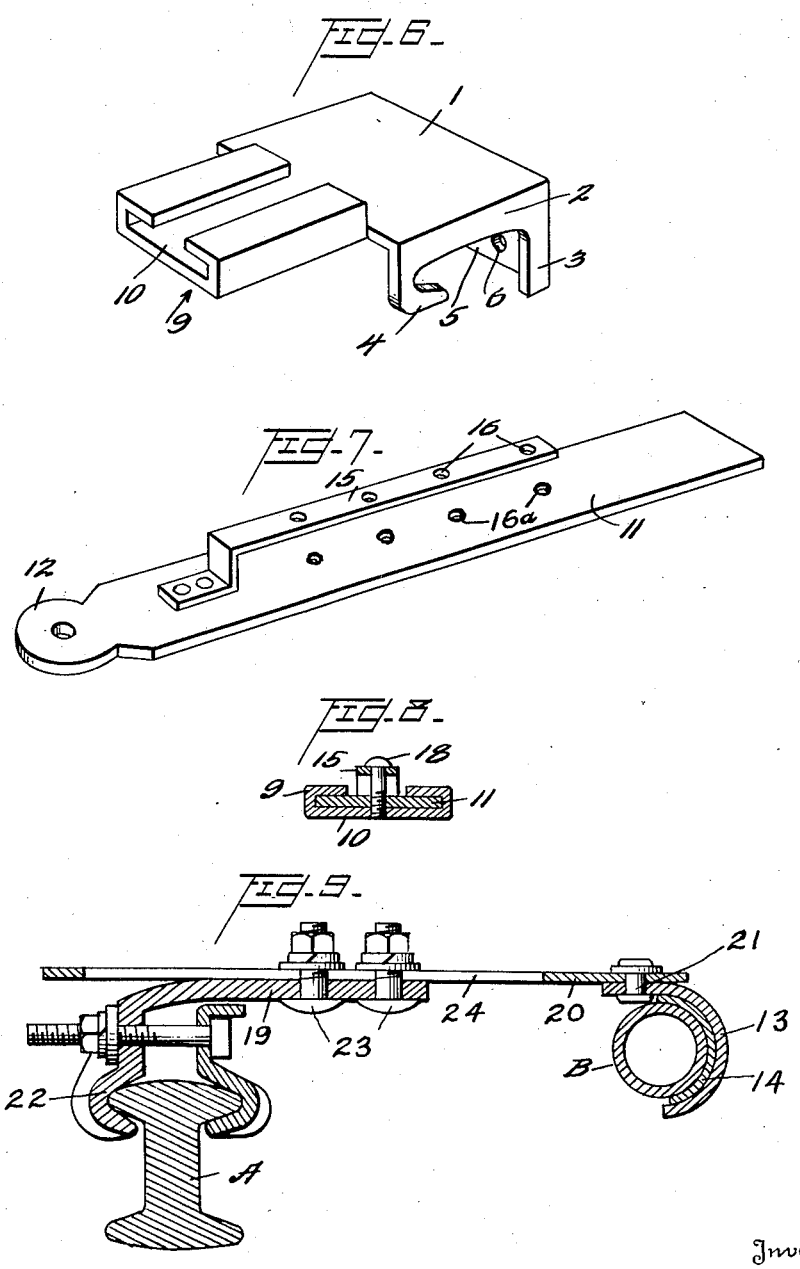
Inventor
Stephen Seth,
By Chas. Silver
Attorney Patented Feb. 23, 1932

1,846,694

UNITED STATES PATENT OFFICE

STEPHEN SETH, OF BALTIMORE, MARYLAND, ASSIGNOR TO SAFETY STEERING CONTROL COMPANY, A CORPORATION OF MARYLAND

ANTISHIMMYING DEVICE FOR STEERING MECHANISM

Application filed January 12, 1932. Serial No. 586,114.

This application is a continuation-in-part of my application Serial No. 298,791, filed Aug. 10, 1928.

This invention relates to new and useful improvements in anti-shimmying devices for steering mechanism.

Numerous attempts have been made to eliminate this shimmying or vibration in steering mechanism, but the devices heretofore employed for this purpose have not been found practical in many cases.

Among the objects of this invention is the provision of a novel device for materially decreasing the usual vibration incident to the steering mechanism of a vehicle while in motion.

A further object of this invention is the provision of a device of this character for interconnection between the usual axle and tie rod of the steering rod of an automobile or other vehicle wherein a frictional body is provided for tensional engagement against the tie rod for arresting and limiting the vibrations of the tie rod and steering wheel connected therewith when the wheels of the automobile are in the straight ahead position.

A further object of this invention is to provide means for effecting contact of the entire length of the friction plate with the tie rod when the steering wheel is moved while the wheels are at and near the straight ahead position and the spacing member bears against the tie rod, thus eliminating the customary local wear at the ends of the friction plate.

Other, further and more specific objects of this invention will become readily apparent to persons skilled in the art from a consideration of the following description when taken with the accompanying drawings wherein:

Fig. 1 is a top plan view illustrating the present invention associated with a conventional axle and steering mechanism of an automobile.

Fig. 2 is an enlarged longitudinal sectional view through a structure embodying the present invention and through the usual axle and tie rod of a vehicle.

Fig. 3 is a cross sectional view through the pivotal arm taken substantially on line 3—3 of Fig. 2.

Fig. 4 is a transverse sectional view taken substantially on line 4—4 of Fig. 2.

Fig. 5 is an enlarged fragmentary view, partly in section, of the invention disclosing the manner of attaching the pivotal arm to the frictional body.

Fig. 6 is an enlarged perspective view of the clamp and guide structure.

Fig. 7 is an enlarged perspective view of the arm adapted to connect the frictional body to the clamp structure.

Fig. 8 is a transverse sectional view similar to Fig. 4 and illustrates the use of a set screw in a modified form of my device for fixing the slide arm to the guide member.

Fig. 9 is a longitudinal sectional view showing a modified form of my invention.

In Fig. 1 there is shown the axle A and tie rod B of the usual steering mechanism designated generally by C. The clamp structure includes an axle plate 1 provided with end flanges 2 having the legs 3 and an inwardly disposed hook 4. The depending portion 5 of the axle plate 1 is formed with openings 6 through which threaded bolts 7 are insertible. These bolts have jam nuts 8 for tightening against the opposite side of the depending plate portion 5 to secure the threaded end of the bolts in engagement with the web portion of the axle A and the hook 4 projecting under the upper flanged portion of the axle as shown in Fig. 2, for preventing accidental displacement of the plate 1 from its superimposed position on the axle.

A guide member 9 projects rearwardly from plate 1 and has its edge portion bent upwardly and then disposed in spaced relation over its intermediate portion to provide the guideway 10 for receiving the slide arm 11. One end of the slide arm 11 is formed with a semi-circular head 12 adapted to be pivoted at its center to the upper portion of an elongated transversely arcuate plate 13 provided with a lining 14 of asbestos or some similar durable material. The lining 14 engages the rear side portion of the usual tie rod B as shown in Fig. 2. The opposite end portion of the arm 11 is slidable through the side plate of the guide member 9.

For the purpose of tensionally urging the arm 11 toward the clamp, an elongated strip 15 which is bent laterally is secured at one end to the slide arm 11 inwardly of its rear end. This strip is formed with openings 16 and is positioned over the guide member 9 while the arm 11 is slidably engaged therein. An elongated coil spring 17 is secured at one end to the forward side of the clamp structure, while its opposite end is secured to the strip 15 through any one of the openings 16.

From the foregoing description of the invention it will be seen that when the parts have been associated in the manner as stated and shown in Fig. 2, the device is ready for use. When the steering mechanism of the vehicle is centered, the frictional body including the plate 13 and lining 14 is engaging the tie rod B snugly. The spring 17 serves to maintain continuous engagement of the arcuate plate 13 with the tie rod B when the wheels are turning as well as when in straight ahead position. Thus any shimmying of the rod will be eliminated, yet this frictional body will not materially hinder the proper operation of the steering mechanism.

The slide arm 11 is formed with a plurality of openings 16a in registry with the opening 16 of the strip 15, so that a set screw 18 may be inserted through certain of the registering openings for threaded engagement within an opening in the intermediate portion of the guide member 9 for adapting the present device to automobile steering mechanisms having different distances between steering rod and axle. By this arrangement the arm 11 is prevented from sliding in the guide member 9, thereby dispensing with the need for the spring 17.

By reference to Fig. 1 it will be seen that the tie rod B is joined to the axle A by two links L and M of equal length which are pivoted to the tie rod at E and F and to the axle at G and H. With this construction, when the automobile wheels are in the straight ahead position, the tie rod B is centered and is parallel to the axle A, thus forming a trapezoidal arrangement with the axle and the two links. As the tie rod moves either to the right or left from the center position, owing to the fact that the distance between the pivotal points E and F is shorter than that between G and H, the tie rod B will not continue parallel to the axle A but will undergo change of angular relationship with respect thereto. Furthermore, as the tie rod B moves from its central position, it also recedes from the arcuate plate 13 and the friction lining 14 and will in some cases be entirely separated from this plate and its friction lining. Upon returning to its central position, the tie rod B will first contact with the friction lining at the end of the arcuate plate 13, and if the plate is rigid the wear upon the friction lining 14 will be practically all at the end. A similar result obtains upon the return to the central position from the opposite side of the center. Consequently, the life of the friction lining is short. I have overcome this objection by pivotally mounting the arcuate plate 13 upon the arm 11, which permits the plate 13 to accommodate itself to the changing angular positions of the tie rod B, and the friction lining 14 will be in contact throughout its entire length with the tie rod when it bears against the arcuate plate, thereby distributing the wear over the whole length. This distribution of wear over the arcuate plate takes place when the arm 11 is slidable and the spring 17 is used as well as with the modification employing the set screw and thereby preventing sliding movement of the arm 11.

In the latter case, with the arm 11 fixed to the axle plate 1, when the wheels are in the straight ahead position the arcuate plate 13 will exert pressure on the tie rod B and owing to the substantial yielding of this tie rod it will bow toward the axle A. When the wheels turn, before separating from the arcuate plate 13, the tie rod B will proceed to return from its bowed position under a decreasing pressure from the arcuate plate 13. By proper selection of tie rod and links L and M and adjustably fixing the arm 11 upon axle plate 1, I have been able to greatly reduce and practically eliminate the distance of projection beyond the tie rod of the arcuate plate when the wheels of the automobile are turned, although in such turned position there is practically no pressure by the arcuate plate upon the tie rod.

In the modified form of my device illustrated in Fig. 9, the spacing member comprises the arms 19 and 20. The arm 20 has at one end the arcuate plate 13 pivotally connected thereto by suitable means such as the pin or rivet 21 and carrying the friction lining 14 for engagement with the tie rod B. The other end of this arm 20 is in adjustable engagement with one end of the arm 19 and the other end of the arm 19 has a suitable clamping mechanism 22 for engagement with the axle A. The fastening bolts 23 pass through bores in arm 19 and through slot 24 in arm 20 and serve to secure the arms 19 and 20 in fixed relation to each other, and the spacing member may be thus adjusted for variation in distance between axle A and tie rod B.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In an apparatus for arresting vibratory movement of an automobile steering wheel, a spacing member having means at one end for rigidly securing said member to an axle of an automobile and means comprising a plate pivoted at the other end of said spacing member for frictionally engaging the tie rod of the steering mechanism when the automobile wheels are in the straight ahead position and near the straight ahead position.

2. In an apparatus for arresting vibratory movement of an automobile steering wheel, an adjustable spacing member having means at one end for rigidly securing said member to an axle of an automobile and means comprising an arcuate plate with a friction lining pivotally joined to the other end of said spacing member for engaging the tie rod of the steering mechanism when the automobile wheels are in the straight ahead position and near the straight ahead position.

3. In an apparatus for arresting vibratory movement of an automobile steering wheel operated by a tie rod which undergoes change of angular relationship relative to the automobile axle while the steering wheel is turned, a spacing member having means at one end for rigidly securing said member to an axle of the automobile, a plate at the other end of said spacing member for engaging the tie rod of the steering mechanism and means comprising a pivot connection between said plate and said spacing member for effecting contact of the entire length of the inner face of said plate with the tie rod when the steering wheel is moved while the automobile wheels are at and near the straight ahead position.

4. In an apparatus for arresting vibratory movement of an automobile steering wheel, a guide member, a clamp on said guide member for attaching the latter to an axle of an automobile, a frictional body for engagement with the tie rod of the steering mechanism, an arm pivoted at one end to said frictional body and having its opposite end in slidable relation with the guide, and tensional means for urging said arm to said guide.

5. In an apparatus for arresting vibratory movement of an automobile steering wheel, a guide member, a clamp on said guide member for attaching the latter to an axle of an automobile, a frictional body for engagement with the tie rod of the steering mechanism, an arm pivoted at one end to said frictional body and having its opposite end in slidable relation with the guide, and tensional means for urging said arm toward said guide, said means comprising a strip secured at one end to said arm and disposed in spaced parallelism therewith, said strip being formed with spaced openings, a spring secured at one end to the clamp and at its opposite end within one of the openings of the strip.

6. An anti-shimmying device for a vehicle, comprising a brace, a clamp at one end of the brace for clamping the same to the front axle of a vehicle, and a pressure member swiveled to the other end of the brace and having a depending part of semi-circular shape for engaging the rear part of the tie rod of the vehicle and applying pressure to the tie rod when the vehicle is moving straight ahead but moving away from the tie rod when the vehicle makes a sharp turn.

STEPHEN SETH.